United States Patent
Hamid et al.

(10) Patent No.: US 10,565,383 B2
(45) Date of Patent: *Feb. 18, 2020

(54) METHOD AND APPARATUS FOR SECURE CREDENTIAL ENTRY WITHOUT PHYSICAL ENTRY

(71) Applicant: Kingston Digital, Inc., Fountain Valley, CA (US)

(72) Inventors: Laurence Hamid, Ottawa (CA); Lawrence Reusing, Newport Beach, CA (US)

(73) Assignee: Kingston Digital, Inc, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,223

(22) Filed: Apr. 10, 2017

(65) Prior Publication Data

US 2017/0213036 A1 Jul. 27, 2017

Related U.S. Application Data

(63) Continuation of application No. 14/747,739, filed on Jun. 23, 2015, now Pat. No. 9,619,637, which is a
(Continued)

(51) Int. Cl.
*G06F 21/57* (2013.01)
*G06F 21/31* (2013.01)
(Continued)

(52) U.S. Cl.
CPC .......... *G06F 21/575* (2013.01); *G06F 9/4406* (2013.01); *G06F 21/31* (2013.01);
(Continued)

(58) Field of Classification Search
CPC ....... G06F 21/575; G06F 21/32; G06F 9/4406
(Continued)

(56) References Cited

U.S. PATENT DOCUMENTS 5,877,483 A 3/1999 Bilich et al.
6,199,079 B1 * 3/2001 Gupta ................. G06F 17/2247
707/999.006
(Continued)

FOREIGN PATENT DOCUMENTS

| GB | 2397923 A | 8/2004 |
|---|---|---|
| KR | 2003061773 A | 7/2003 |
| WO | WO02093468 A1 | 11/2002 |

OTHER PUBLICATIONS

Adelstein, "Malicious Code Detection for Open Firmware", 2002, IEEE, pp. 1-10 (Year: 2002).*
(Continued)

*Primary Examiner* — Taghi T Arani
*Assistant Examiner* — Gregory A Lane
(74) *Attorney, Agent, or Firm* — Dorsey & Whitney LLP (57) ABSTRACT

A storage device is provided with memory configured to store user authentication data for accessing an operating system executing on a host computer. A processor is provided to receive a command indicating readiness to accept input from the operating system, and to retrieve the user authentication data from the memory in response to the command.

16 Claims, 10 Drawing Sheets

Related U.S. Application Data continuation of application No. 14/170,074, filed on Jan. 31, 2014, now Pat. No. 9,064,103, which is a continuation of application No. 11/539,389, filed on Oct. 6, 2006, now Pat. No. 8,661,540.

(60) Provisional application No. 60/724,279, filed on Oct. 7, 2005.

(51) Int. Cl.
*G06F 21/34* (2013.01)
*G06F 21/32* (2013.01)
*G06F 21/35* (2013.01)
*G06F 9/4401* (2018.01)
*G06F 21/62* (2013.01)

(52) U.S. Cl.
CPC .............. *G06F 21/32* (2013.01); *G06F 21/34* (2013.01); *G06F 21/35* (2013.01); *G06F 21/6218* (2013.01); *G06F 2221/2115* (2013.01)

(58) Field of Classification Search
USPC .......................................................... 726/23
See application file for complete search history.

(56) References Cited

U.S. PATENT DOCUMENTS

| | | | |
|---|---|---|---|
| 6,820,148 B1 | 11/2004 | Cedar et al. | |
| 7,080,051 B1* | 7/2006 | Crawford | G06F 8/61 379/111 |
| 7,213,266 B1 | 5/2007 | Maher et al. | |
| 7,269,669 B2 | 9/2007 | Liu et al. | |
| 8,272,053 B2* | 9/2012 | Markham | G07C 9/00158 726/23 |
| 8,458,465 B1* | 6/2013 | Stern | G06F 21/32 709/229 |
| 9,009,816 B2 | 4/2015 | Hamid | |
| 2002/0010679 A1 | 1/2002 | Felsher | |
| 2002/0073340 A1 | 6/2002 | Mambakkam et al. | |
| 2002/0194499 A1 | 12/2002 | Audebert et al. | |
| 2004/0193925 A1 | 9/2004 | Safriel | |
| 2004/0230536 A1* | 11/2004 | Fung | G06Q 20/382 705/64 |
| 2005/0017070 A1* | 1/2005 | Miller | G06K 17/00 235/380 |
| 2005/0188167 A1 | 8/2005 | Squibbs et al. | |
| 2005/0206353 A1 | 9/2005 | Sengoku | |
| 2005/0216746 A1 | 9/2005 | Saika | |
| 2005/0278540 A1 | 12/2005 | Cho et al. | |
| 2006/0021041 A1 | 1/2006 | Challener et al. | |
| 2006/0031289 A1* | 2/2006 | Experton | G06F 9/4843 709/204 |
| 2006/0031926 A1* | 2/2006 | Shoham | G06F 21/41 726/8 |
| 2006/0161783 A1 | 7/2006 | Aiken et al. | |
| 2006/0168509 A1* | 7/2006 | Boss | G06F 17/243 715/226 |
| 2006/0179404 A1* | 8/2006 | Yolleck | G06F 17/243 715/272 |
| 2006/0224847 A1 | 10/2006 | Seto et al. | |
| 2007/0057763 A1* | 3/2007 | Blattner | G06F 3/03543 340/5.52 |
| 2007/0199053 A1 | 8/2007 | Sandhu et al. | |
| 2008/0059742 A1 | 3/2008 | George et al. | |
| 2008/0060059 A1 | 3/2008 | Yoshida | |
| 2008/0114980 A1 | 5/2008 | Sridhar | |
| 2009/0025091 A1 | 1/2009 | Koike et al. | |
| 2009/0204240 A1 | 8/2009 | Ait Yacine | |
| 2009/0248966 A1 | 10/2009 | Crandell | |
| 2009/0249014 A1 | 10/2009 | Obereiner et al. | |
| 2010/0125695 A1 | 5/2010 | Wu et al. | |
| 2010/0146264 A1 | 6/2010 | Bilume et al. | |
| 2010/0153672 A1 | 6/2010 | Jogand-Coulomb et al. | |
| 2010/0186084 A1 | 7/2010 | Hamid | |
| 2010/0205355 A1 | 8/2010 | Moskalik | |

OTHER PUBLICATIONS

Yin, Y. "SonD: A Fast Service Deployment System Based on IP San", 2008, IEEE, p. 1-10.

Kaplan, "Solutions Superguide 501 tips for better computing", Jun. 2008, PC Magazine, p. 62-88.

Vasa, "MEDROIDIPART 7: Data storage & retrieval", Mar. 2013, Computers & Applied Sciences Complete, vol. 32, p. 1-6.

* cited by examiner

Fig 1A: Typical Computer Configuration with Memory Module Interfacing

Fig 1B: Typical Entry Screen of Commercial Software Application

Fig 1C: Simplified Communications Dataflow of MicroProcessor and Memory Module

Fig 2: Simplified Schematic of Computer with Optional Interface Modules and Memory Module Fig 3: Exemplary Flow Diagram of Memory Module Deciding on Driver Device to Mimic Fig 4: Simplified Schematic of Computer with Memory Module Interfacing under Fully Loaded USB Interface Fig 5: Simplified Schematic of Computer with Memory Module Interfacing with Biometric Verification Fig 7: Exemplary Flow Diagram for Triggering Re-Verification of Users Biometric Measurement Fig 8: Simplified Schematic of Memory Module with Biometric Measurement and Memory Protection

METHOD AND APPARATUS FOR SECURE CREDENTIAL ENTRY WITHOUT PHYSICAL ENTRY

This application is a continuation of U.S. patent application Ser. No. 14/474,739, filed Jun. 23, 2015, issued Apr. 11, 2017 as U.S. Pat. No. 9,619,637, which is a continuation of U.S. patent application Ser. No. 14/170,074, filed Jan. 31, 2014, issued Jun. 23, 2015 as U.S. Pat. No. 9,064,103, which is a continuation of U.S. patent application Ser. No. 11/539,389, filed Oct. 6, 2006, issued Feb. 25, 2014 as U.S. Pat. No. 8,661,540, which claims benefit of priority from U.S. Provisional Patent Application No. 60/724,279, filed Oct. 7, 2005, each of which is incorporated by reference herein, in the entirety and for all purposes.

FIELD

The invention relates to the field of computer security and more particularly to the field of automated user authentication at system startup.

BACKGROUND

In recent years, there has been growing use of security architectures whereby the user is required to provide multiple credentials at different stages of logging onto microprocessor based systems such as personal computers (PCs), Internet terminals and personal data analyzers (PDAs). In the simplest form these credentials is a user identity, which is checked against a list of valid user identities stored within the system, and a password, which is validated against stored data relating to the user identity to verify the user identity.

In these instances entering the requisite information—logging on or login—is a physical event, most commonly the typing of both user identity and password using a symbol entry device such as a keyboard attached to the system. It has therefore been a normal part of accessing computer systems for the software to display a simple login screen or window where there exist fields for the user identity and password to be entered. It was initially a pre-requisite of these login screens that the user remembered both parts of the login information. Typically, both were simple alphanumeric codes for the user to remember and consequently, they were often easily guessed or determined.

Currently, when using computer systems and software applications, a person has a large number of passwords, for example for accessing a home computer, a work computer, Internet banking, music downloads, electronic mail, secured files, encryption keys, and online auction sites amongst the most common ones. A user memorizes these passwords, writes then down, stores them on their computer, or synchronizes them all so that they are all the same. Another approach to password management is to allow the system to automatically store login data. This obviously makes the security of an individual's personal information quite weak allowing others to rapidly access said information and use it once they have access to the computer system. This is a basis of the criminal activity commonly known as "identity theft." The requirement for an individual to validate the legitimacy of their authentication information, be it only a single application or many, lies at the very heart of the security of any information based activity, and thus it has been the matter of much research.

With the continuing advances in semiconductor circuit design, the density of memory circuits has continued to advance, whilst their power requirements have continued to decrease. As a result there has been a rapid proliferation of uses of semiconductor memory including the provision of portable solid state memory devices. This has replaced prior magnetic storage media including tapes and diskettes, which were known colloquially as "floppy discs." Today, solid-state memory is packaged within many physical formats as the basic function is overtaken by fashion, style and marketing. A common form of solid-state memory is the USB (Universal Serial Bus) memory "key" for interfacing with a USB port of a host computer system.

Typically, these peripheral memory storage devices are "Plug and Play" devices, using existing "standard" device drivers such that they operate identically on all systems without any device driver installation. For example when using MICROSOFT® WINDOWS XP™ operating system based computer systems, a computer detects that a USB device is coupled to the computer and automatically interrogates the device to learn its capabilities and requirements. Using this information, the computer then automatically associates a standard driver for supporting the determined capabilities and requirements previously loaded with the operating system. Alternatively, a device specific device driver is loaded. These drivers support existing functions and prevent operations that are either unsupported or potentially problematic. Later, when the device is disconnected from the bus, the operating system automatically disables the device from the bus and, optionally unloads its driver from the system.

It is therefore possible to store within the memory stick security information of a user to be accessed by either the user or the computer system when needed; however, since this requires accessing the memory device, the device drivers must be in execution on the host computer system prior to accessing of the data. Thus, to maintain security, device specific drivers are typically required. Unfortunately, the very first login screen for accessing WINDOWS operating systems either prevents access to or precedes initialization of device specific drivers. Thus, security data for the first login screen always has to be entered into the system from the keyboard and from the personal memory of the user or would have to be completely automated using functionality of the operating system for the computer—stored within the hard drive of the computer and automatically entered by the operating system regardless of who is starting the operating system. Neither of these solutions is both convenient and secure.

It would therefore be advantageous to provide a method and apparatus for automatically populating the login window of a WINDOWS® based computer system that does not require modification of the operating system and that maintains a level of security for the computer.

SUMMARY

In accordance with the invention there is provided a method comprising: providing a computer system; providing a peripheral memory storage device coupled with an interface of the computer system for communication therewith; starting a WINDOWS® based operating system on the computer system; displaying a WINDOWS® login screen; and, automatically populating fields within the WINDOWS® login screen with data extracted from the peripheral memory storage device and provided to the computer system via the interface, the interface enabled by the WINDOWS® operating system prior to display of the login screen.

In accordance with another embodiment of the invention there is provided a method comprising providing a computer system comprising a BIOS memory having a BIOS stored therein; providing a peripheral memory storage device coupled with an interface of the computer system for communication therewith, the interface enabled by execution of default interface drivers forming part of the BIOS, the peripheral memory storage device having stored therein user authorization data of a user; in response to a system login request event, transferring from the peripheral memory storage device said user authorization data via the interface in accordance with a functionality of a manual symbol entry device.

In accordance with another embodiment of the invention there is provided a method comprising: providing a computer system comprising a BIOS memory having a BIOS stored therein, the BIOS including support programming for a first symbol entry device for having symbols manually entered therewith for provision to the computer system, the BIOS further including a default interface driver forming part of the BIOS and for supporting a default interface and peripheral devices coupled therewith; providing a peripheral memory storage device having stored therein user authorization data and coupled with the default interface for communication therewith, the default interface enabled by execution of the default interface driver; executing an operating system application of the computer system comprising a system login request event; retrieving from memory within the peripheral storage device first user authorization data; and, transferring from the peripheral storage device in response to the system login request event the first user authorization data via the default interface mimicking data entered at the first symbol entry device.

BRIEF DESCRIPTION OF THE DRAWINGS

Exemplary embodiments of the invention will now be described in conjunction with the following drawings, in which.

DETAILED DESCRIPTION

Figure 1A:
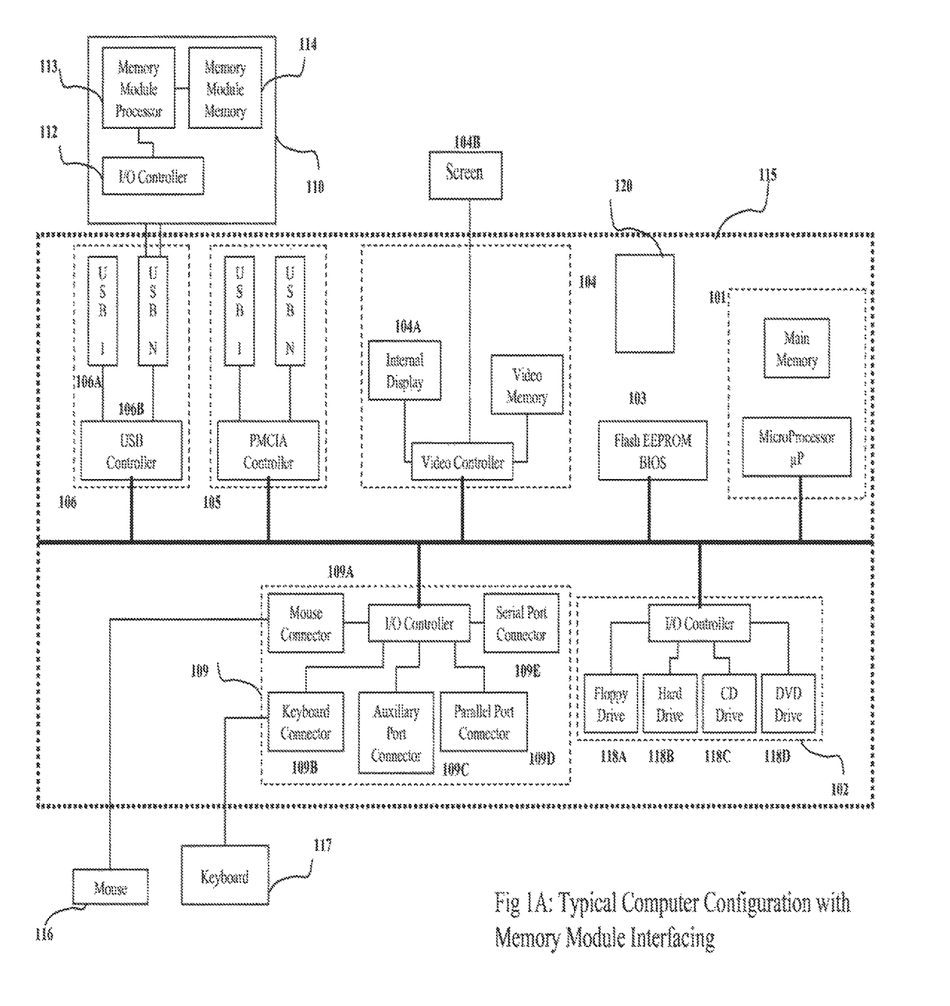
FIG. 1A illustrates the typical configuration of a computer system and interfacing of peripheral memory storage device to an interface port wherein the module mimics the function of a keyboard to enable automatic security credential verification.

Referring to FIG. 1A, shown is a block diagram illustrating interconnectivity between a computer system 115 and a flash drive peripheral memory storage device 110 for carrying out an embodiment of the invention. Illustrated is a computer system 115, with a central microprocessor and memory block 101, a first input/output controller and hardware block 102 providing access to internal storage elements such as floppy drive 118A, hard disk drive 118B and external storage elements such as CD drive 118C and DVD drive 118D. These are coupled via the computer's internal bus 107 to which is also connected Flash EEPROM memory 103 which holds the BIOS for the computer. Also within the computer and accessing this internal bus 107 are a second input/output controller 109 which provides interconnectivity to generic computer connectors for the optional addition of dynamic pointer (Mouse) 116 through connector 109A, a keyboard via 109B together with the serial port 109E, parallel port 109D and auxiliary port 109C. User visibility of computer activities is via display element 104 and its associated controllers. Additional functionality such as wireless interface is optionally provided through the use of PMCIA interface 105, which comprises sub-elements of a controller and physical sockets. Finally accessing this central communications bus 107 is the Universal Serial Bus portion of the computer 106, comprising connector ports 106A and USB controller 106B.

Interconnected to all of the different elements of the computer is a power source in the form of power supply 120.

Prior to starting the computer—power up, a user connects a peripheral memory storage device 110 to an interface port of the computer in the form of USB port 106A. Coupling is achieved by mating connector shell 111 on the peripheral memory storage device with the connector of USB port 106A. Internal to the peripheral memory storage device 110 are a third input/output controller 112, internal microprocessor 113 and memory 114.

At power up of the computer 115, the microprocessor element 101 initiates reading of the BIOS (basic input/output memory system) memory 103 thereby extracting the built-in instruction codes that determine how the computer system functions absent programming from a disk. On personal computers 115, the BIOS contains all the code required to control a keyboard 117, display 104, disk drives 118A, 118B, 118C, 118D, serial communications 106, 109D and a number of other miscellaneous functions.

Figure 1B:
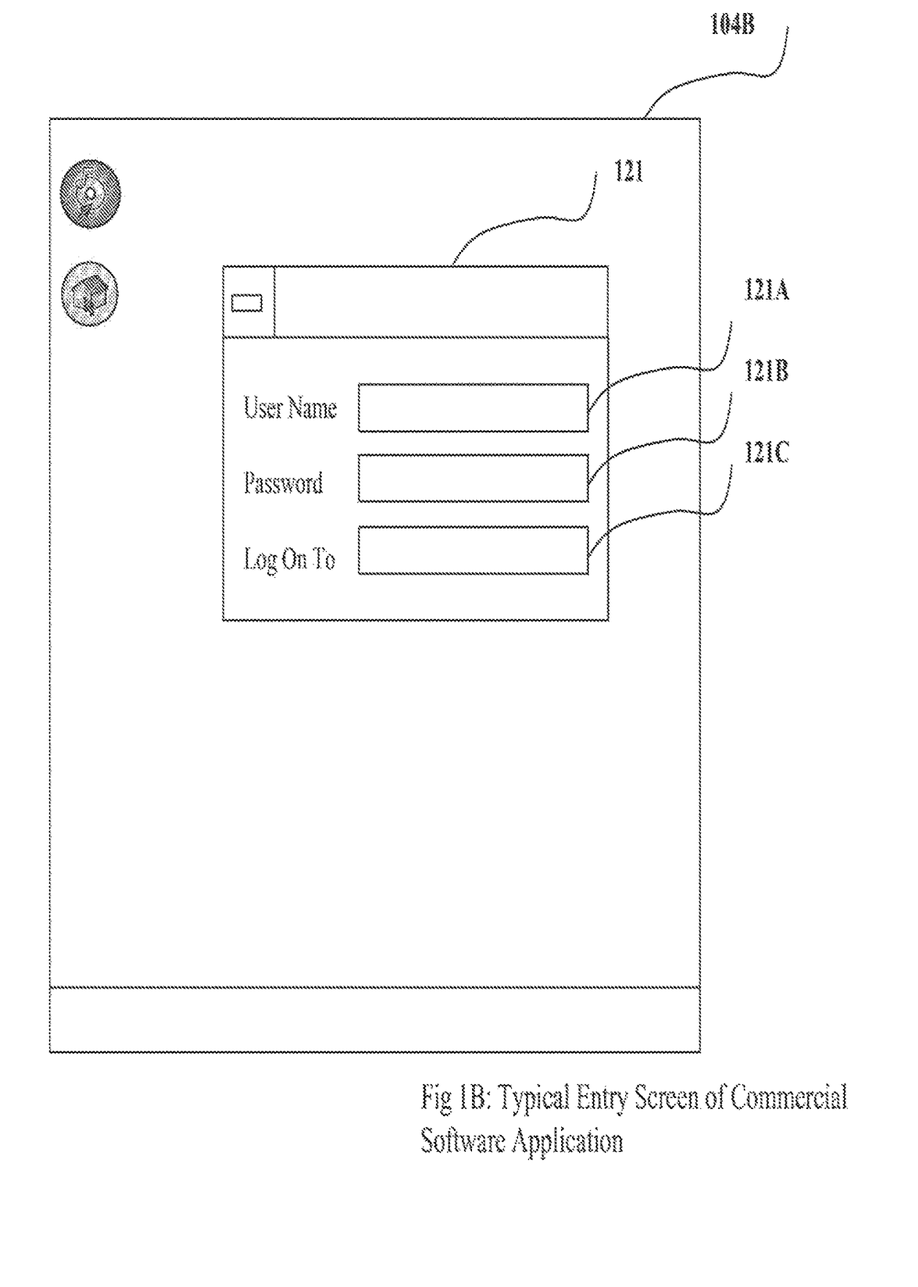
FIG. 1B illustrates the typical entry screen of a computer using a commercial operating system.

Referring now to FIG. 1B, after the execution of the instruction codes retrieved from the BIOS, the computer 115 begins the loading and executing of instruction data relating to an operating system defined for this machine. During this process, the display 104 optionally displays progress information and, for example, the keyboard 117 is disabled to prevent errors from invalid command entry or keyboard interrupts. At some point a software application in execution in the form of the operating system software generates a prompt that typically requests the user to enter three fields of information. These are, for example, user name 121A, password (security credential) 121B and a name of the computer being logged into 121C, which is typically either a discrete identity of the computer system or that of a central server in the event of the computer being networked.

Figure 1C:
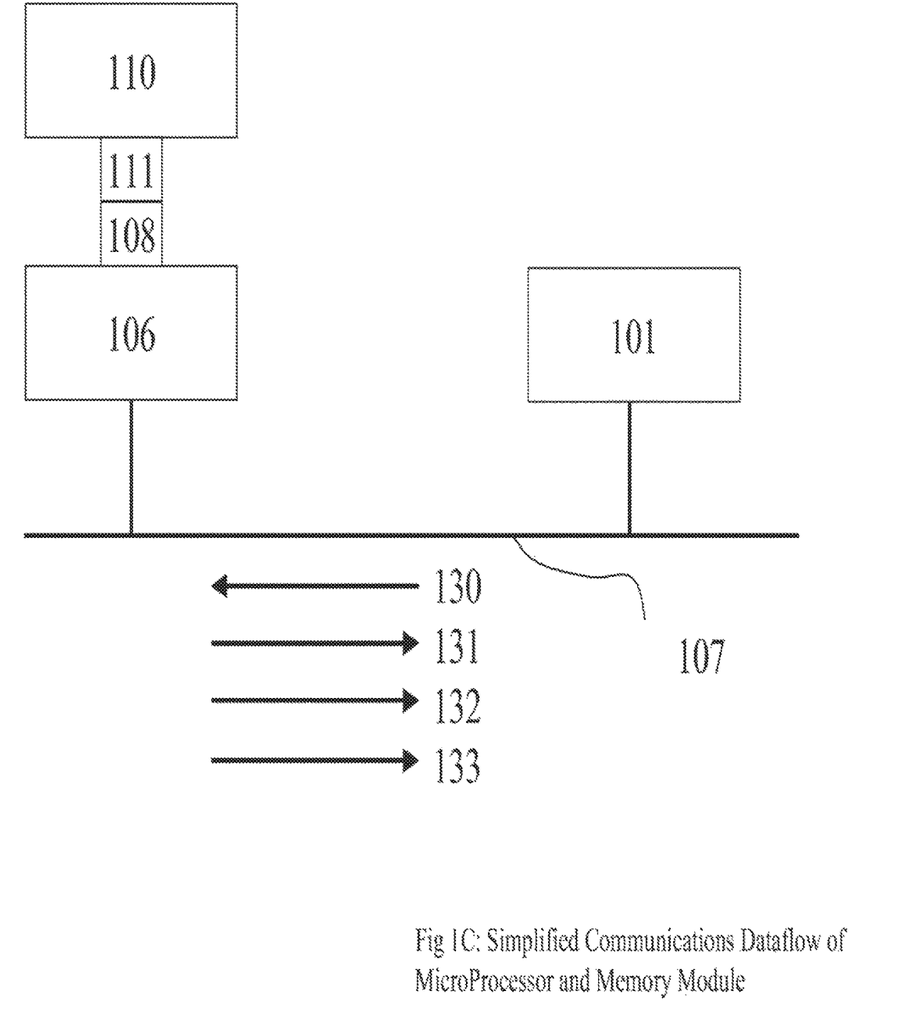
FIG. 1C illustrates a simplified data communications command flow between the central microprocessor and the peripheral memory storage device via the computer bus.

Now referring to FIG. 1C as the entry screen 121 is displayed, the microprocessor 101 places onto the internal bus 107 a command 130 denoting readiness to accept input for example in response to a user initiated sequence. More commonly, the user initiates data entry from the device by actuating a control input port on the device, for example a button or imager. Sensing this, the peripheral memory storage device 110 extracts a first user credential—user name 121A—from the memory 114 wherein it is converted by circuitry within the peripheral memory storage device in the form of a microprocessor 113 to a command sequence matching an anticipated command set 131 of a user interface and placed onto the bus alongside with other necessary data of flags being set to denote completion of activity. For example, in the case of a keyboard, a tab value is inserted between the data fields and a carriage return data value is inserted after the data. This user name 121A is then typically displayed as text in the appropriate field of the screen 104B. Subsequently, the peripheral memory storage device 110 extracts the second credential—password 121B—and repeats the communication of this as a data command 132 onto the bus 107; typically, password data is obfuscated during display thereof. Finally a third credential is optionally extracted and communicated 133 representing the reference identity 121C for the computer being accessed.

As is noted, a user of the computer system is not involved in the user name and password entry process. Thus, once the peripheral memory storage device is coupled to the computer and is operational, the computer is logged into automatically without user intervention. Absent the peripheral memory storage device, the computer is accessible by way of manually providing user authorization data thereto.

Alternatively, the peripheral memory storage device is connected to a PMCIA interface 105 of the computer as opposed to USB interface 106. This is particularly applicable to systems wherein the PCMCIA interface is enabled during the login event. Further alternatively, the peripheral memory storage device is coupled to one of a parallel port and a serial port of the computer. Further alternatively, the peripheral memory storage device is wirelessly coupled to a wireless interface of the computer. Of course, it is evident to someone of skill in the art that the port to which the peripheral memory storage device is coupled is supported by the operating system at the start up logon display screen and supports the functionality described hereinabove for mimicking of a data entry device.

Figure 2:
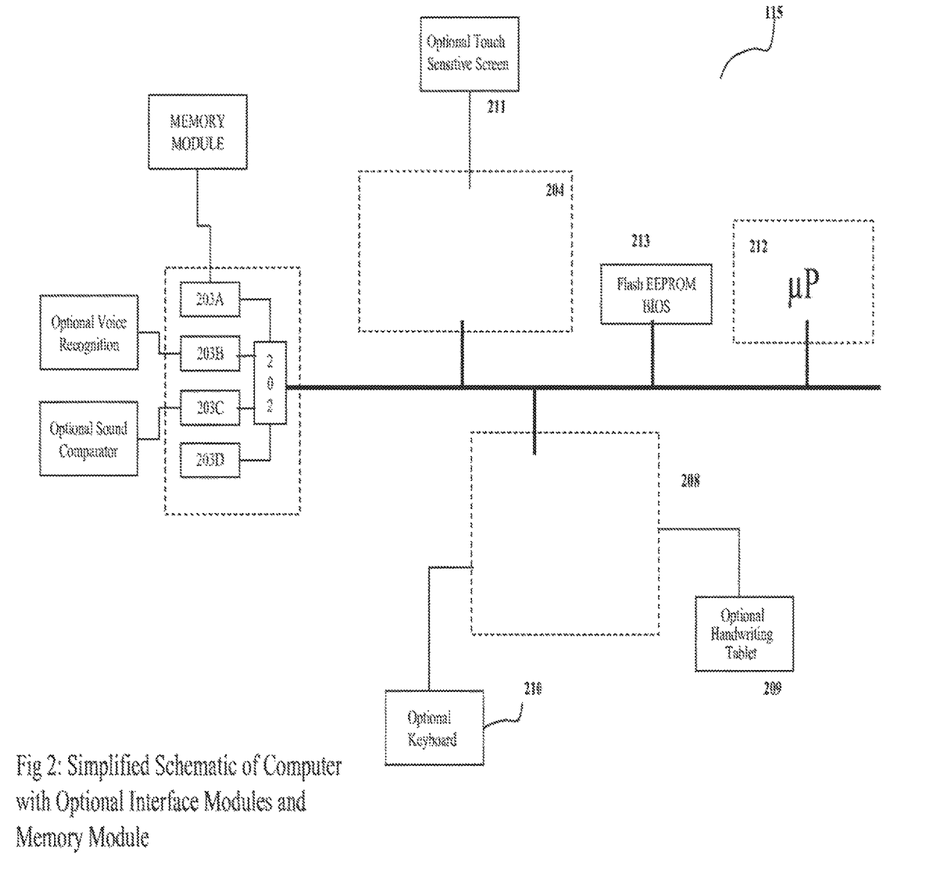
FIG. 2 illustrates the typical configuration of a computer system wherein the peripheral memory storage device is attached to a generic interface port and mimics the function of a physical user interface for automatic entry of security credentials.

FIG. 2 illustrates an ability of the peripheral memory storage device to provide secure user credential information via different physical interfaces. The computer bus 201 communicates to an input/output interface 208 for physical entry management, a display interface 204 and another input/output interface 202 controlling USB ports. Optionally coupled with these interfaces is one or more of a keyboard 210, handwriting tablet 209, voice transducer 206, sound comparator 207, and a touch sensitive screen 211.

As the BIOS 213 is loaded from ROM memory, microprocessor 212 polls all recognized data entry ports to identify which of the different data input devices, namely keyboard 210, tablet 209, touch sensitive screen 211 and sound analysis elements 206 or 207 are present. As with the previous embodiment, peripheral memory storage device 110 is already coupled to a USB port, in this case 203A. As the microprocessor 212 loads the BIOS 213 and validates the presence of user interface devices, the peripheral memory storage device monitors and determines a user input device to mimic.

When the operating system prompts to accept the first user credential, the peripheral memory storage device extracts said information from its memory store, converts it to the appropriate command syntax for the device being mimicked and provides this to the USB port 203A. This sequence is repeated for each user authorization data prompted for by the operating systems boot-up procedure. In this manner the computer system is started securely without the intervention of the operator in and there is provided a compact, portable module interfacing with the communications port of the microprocessor based system or equipment.

It is therefore clear to those skilled in the art that bypassing of manual user entry of user authorization data by exploiting credentials stored within a peripheral memory storage device increases security as the user authorization data are optionally quite complex and indeterminate. Further, a user does not need to use memorable passwords, user names, or system equipment identities. Of course, with the storage of user authorization data in the peripheral memory storage device, the user authorization data are optionally radically different and without common theme even within a small group or enterprise. Optionally, the user authorization data is modified at short intervals, something that is very difficult to effect with user memorized passwords.

Further, it is evident to those skilled in the art that this automatic entry of the user authorization data is extensible and repeatable for the accessing of subsequent software applications, database access etc. In this manner the user authorization data are optionally different application-to-application, which is generally not the case today as users limit the number of passwords they have to remember.

Figure 3:
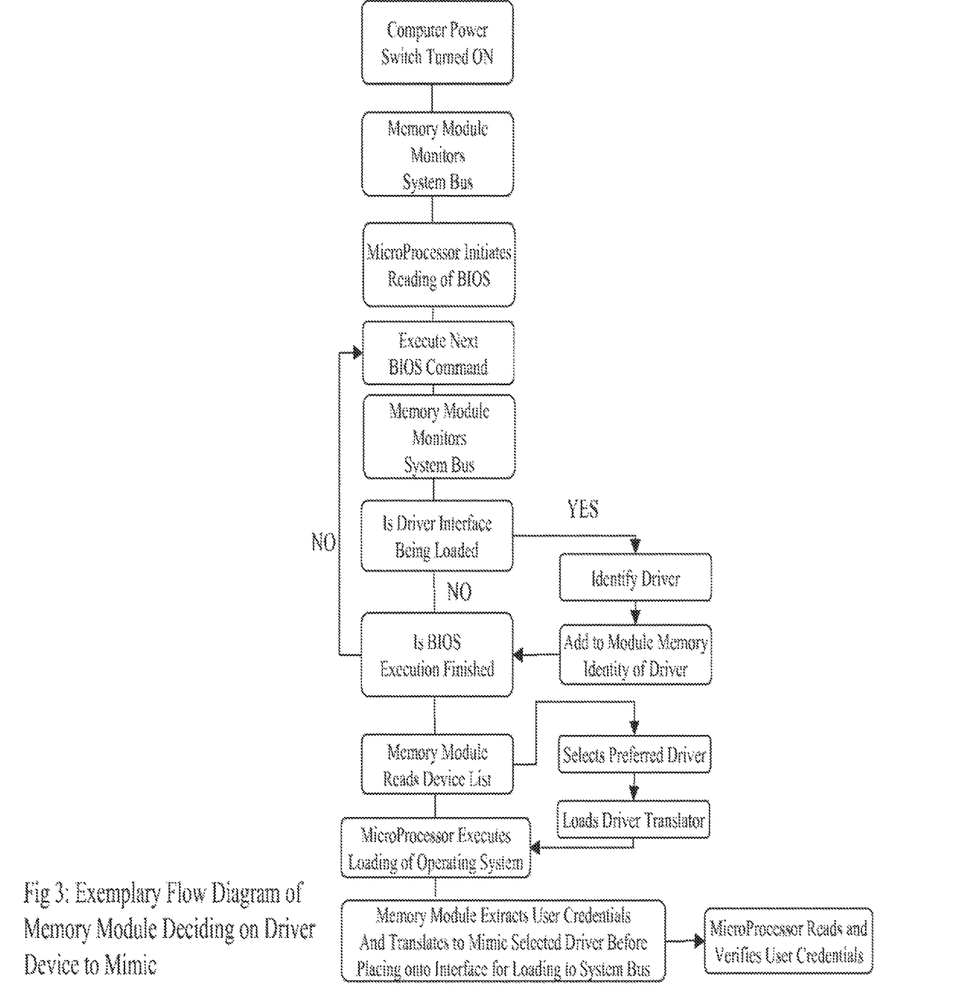
FIG. 3 illustrates a typical flow diagram wherein the peripheral memory storage device detects the default drivers loaded, selects one and then mimics the said physical user interface for secure entry of user security credentials.

FIG. 3 shows a typical flow diagram wherein the peripheral memory storage device has the ability to perform communication via any default driver loaded by the BIOS even where said devices are not currently present or configured for the system. This feature exploits the desire of developers of BIOS to maximize a number of computer platforms their system is deployed on. Therefore the BIOS often contains device drivers for multiple port formats, interface equipment protocols etc. Further optionally, the peripheral memory storage device mimics an element of the system such that a successful power up is achieved even if said interface is not present. One such common example is a keyboard—most personal computers do not start up without the presence of a keyboard.

At power up, the computer triggers the BIOS to load and the peripheral memory storage device monitors the computer bus for commands validating the presence of different elements. Upon detecting a command on the computer bus, the module decodes the command request to define the physical element being sought. If the element matches one that the peripheral memory storage device supports then the internal memory of the module is addressed to denote this as a valid option. Thereafter, if the real element has not responded within a pre-determined time period, the peripheral memory storage device transmits a command string mimicking a validation string from the said element. As all drivers within the BIOS are loaded, this loop repeats until it notes a completion of the BIOS loading.

At this point, the peripheral memory storage device extracts a list of valid drivers and using a prioritized look-up defines the user input device it will mimic and loads appropriate translation command structures for the selected user input device. Thereafter upon waiting and noting a prompt for input user authorization data from the operating system, the peripheral memory storage device extracts the appropriate user authorization data sequence, converts it and places the converted user authorization data sequence onto the computer bus wherein the microprocessor retrieves the sequence and undertakes validation of the user. A result of this process is a subsequent accepting or rejecting of the user authorization attempt.

Therefore, it would be evident to one skilled in the art that the peripheral memory storage device may detect the presence of and mimic multiple user interfaces including, but not limited to a keyboard, mouse, handwriting tablet, voice recognition system, etc.

Figure 4:
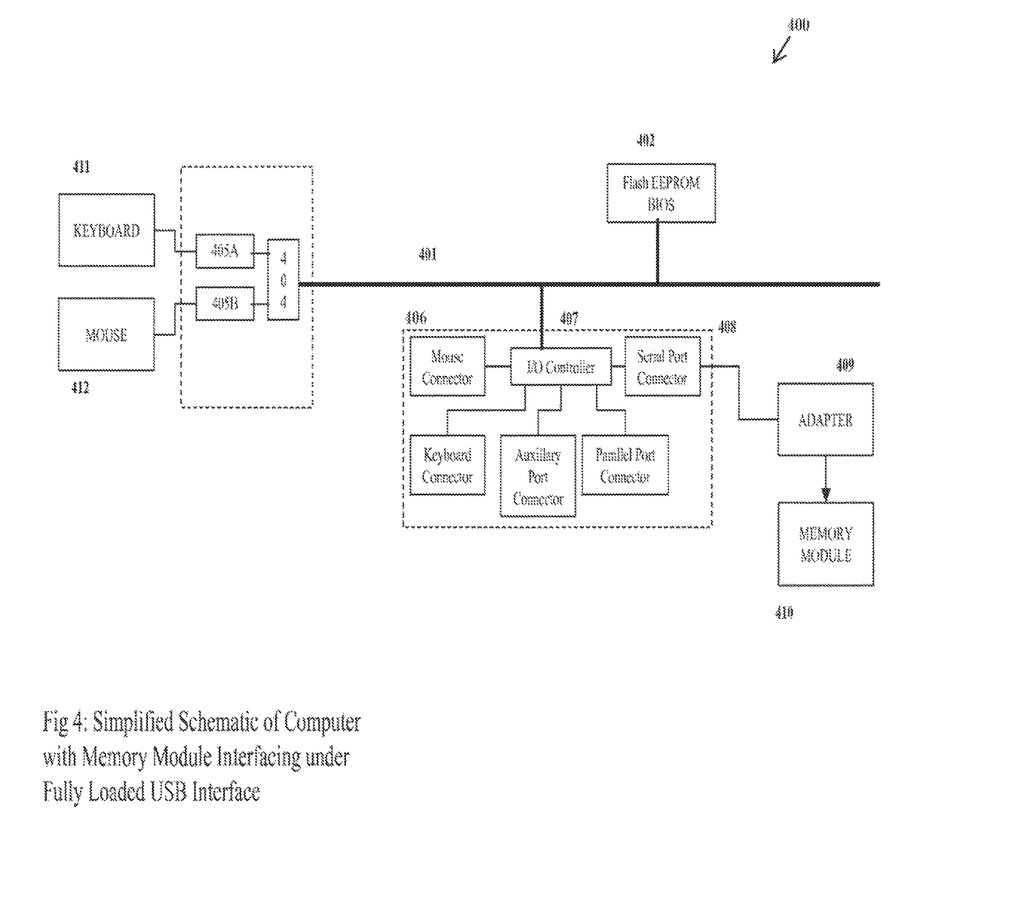
FIG. 4 illustrates a typical flow diagram wherein the computer automatically detects the presence of peripheral memory storage device and its function, thereby configuring the port for secure automatic entry of user security credentials and bypassing any attached physical entry interface.

Referring to FIG. 4, a further embodiment of the automation is outlined wherein the personal computer 400 has been assembled as per normal practices and thus upon system power up executes a BIOS 402. The computer 400 has USB capabilities 403 wherein a USB controller 404 addresses USB slots 405A, 405B. The computer only has, for example, two USB ports 405A, 405B that are connected to peripheral devices. In this exemplary embodiment, USB port 405A is connected to a USB enabled keyboard 411 and the second USB port 405B is connected to a USB enabled mouse 412. Therefore the only accessible interfaces are accessible via the general input/output section 406 of the computer 400. Within this input/output section 406 there is a controller circuit 407 which has several standard connector ports of which one is an industry standard serial port connector 408.

In this embodiment the user connects the peripheral memory storage device 410 to this serial port connector 408 using an adapter 409. Now at system power up the BIOS 402 is loaded and the peripheral memory storage device 410 detects the activity but also recognizes by the assigned commands on the data bus 401 provided via the serial port that it is attached to serial port connector 408. The peripheral memory storage device implements additional coding of the user security credentials such that when provided from the peripheral memory storage device 410 to the serial port 408 and via the controller 407 to the internal system bus 401, they appear to mimic a user data input device supported on the port to which the peripheral data memory storage device is coupled. In this manner the computer is automatically provided the user authorization data.

It is apparent to those skilled in the art that this embodiment is extensible such that the peripheral memory storage device is optionally coupled to any non-occupied port of the computer supported by the BIOS and supporting mimicking of a user text data entry device therefrom. Additionally when coupled to said non-occupied port the peripheral memory storage device is configured to mimic other physical interface devices such as a handwriting tablet, microphone, image recognition etc. and not simply the default embodiment of a keyboard.

Figure 5:
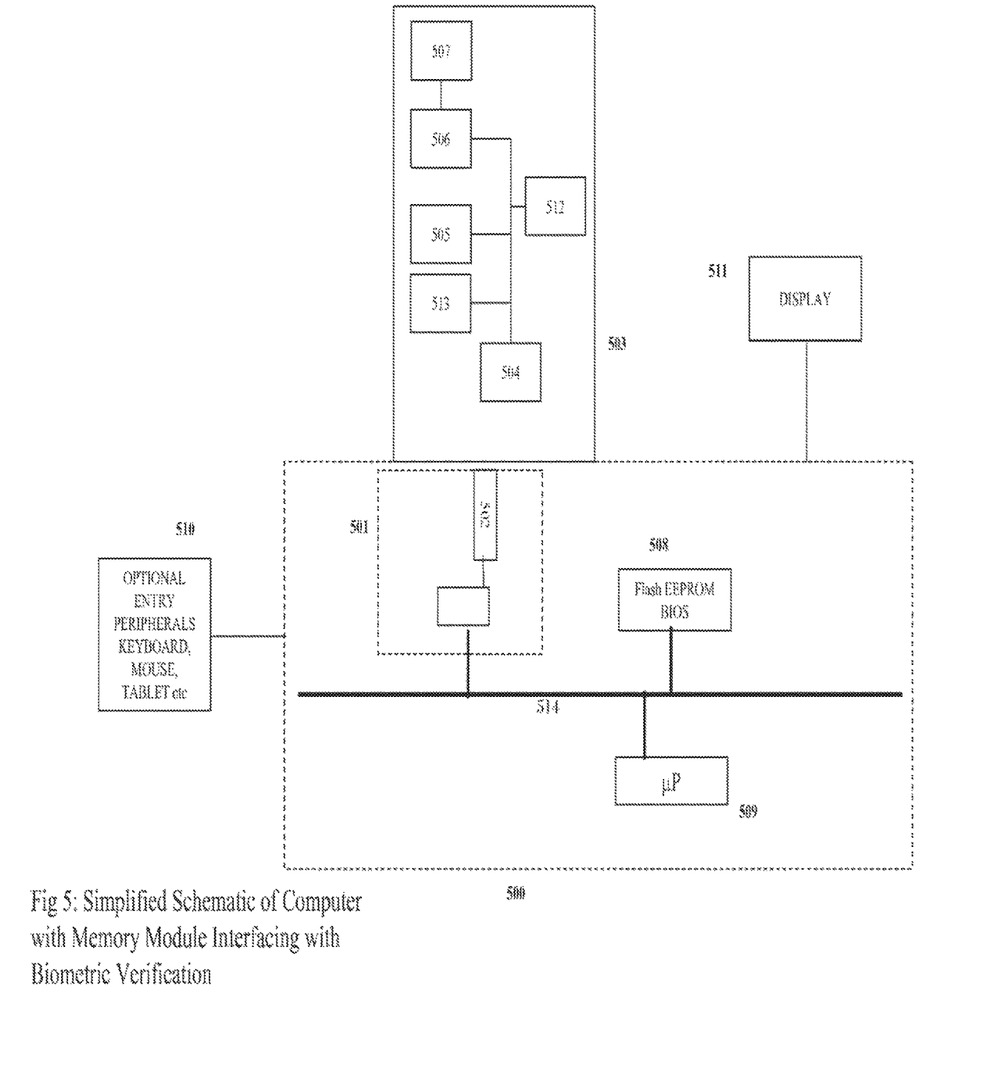
FIG. 5 illustrates a typical embodiment of the peripheral memory storage device wherein a biometric verification of the user's identity is made prior to the module transmitting the secure user security credentials and mimicking a physical user interface.

FIG. 5 shows a simplified schematic of a peripheral memory storage device for secure log-on wherein additional protection is achieved. The peripheral memory storage device requires verification of a physical attribute of the user prior to releasing the internally stored credentials to an application.

The computer 500 comprises a USB interface section 501 and a USB port 502. Into the USB port 502 is plugged the peripheral memory storage device 503. At power up of the system, the microprocessor 509 begins loading the default configuration and drivers from BIOS 508 and then executes the loading of the operating system. At this point the peripheral memory storage device detects for a prompt for user data to be provided from an attached physical entry device 510 and begins the loading under its own internal processor 505 of user authorization data prior to the module interface controller 504. In doing so, the microprocessor triggers the display of a message on display 511 or alternatively an LED on the peripheral memory storage device being activated.

The message is for prompting a user to physically verify their identity directly to the peripheral memory storage device with, for example, a biometric scan. A first such embodiment comprises fingerprint verification wherein the user makes finger contact with a fingerprint sensor in the peripheral storage device 507 or in communication therewith, which forms a digital representation of a fingerprint and provides this to an analyzer 506 for comparison with a template based on a reference fingerprint and stored in memory 513.

After the fingerprint has been verified, the peripheral memory storage device controller 505 continues the process of extracting the user authorization data and placing these onto the internal bus 514 of the computer via the USB interface port and in accordance with an operation of a user data entry device in the form of a keyboard. In this manner therefore the peripheral memory storage device mimics the keyboard entry of the user authorization data and only does so after a physical verification of a biometric information sample. This enhances security, preventing unauthorized use of a peripheral memory storage device when it is found, for example after being misplaced or stolen or when it is left coupled with a computer system.

It will be evident to someone skilled in the art that the biometric transducer and analyzer are optionally other biometric recognition systems, for example, retinal scan, iris scan, facial recognition, handwriting recognition, and voice print recognition. Further, the sensor 507 and analyzer 506 are optionally a separate module to the peripheral memory storage device 503. For example, the separate module is optionally coupled to another USB port on the computer system and is controlled by the peripheral memory storage device.

Figure 6:
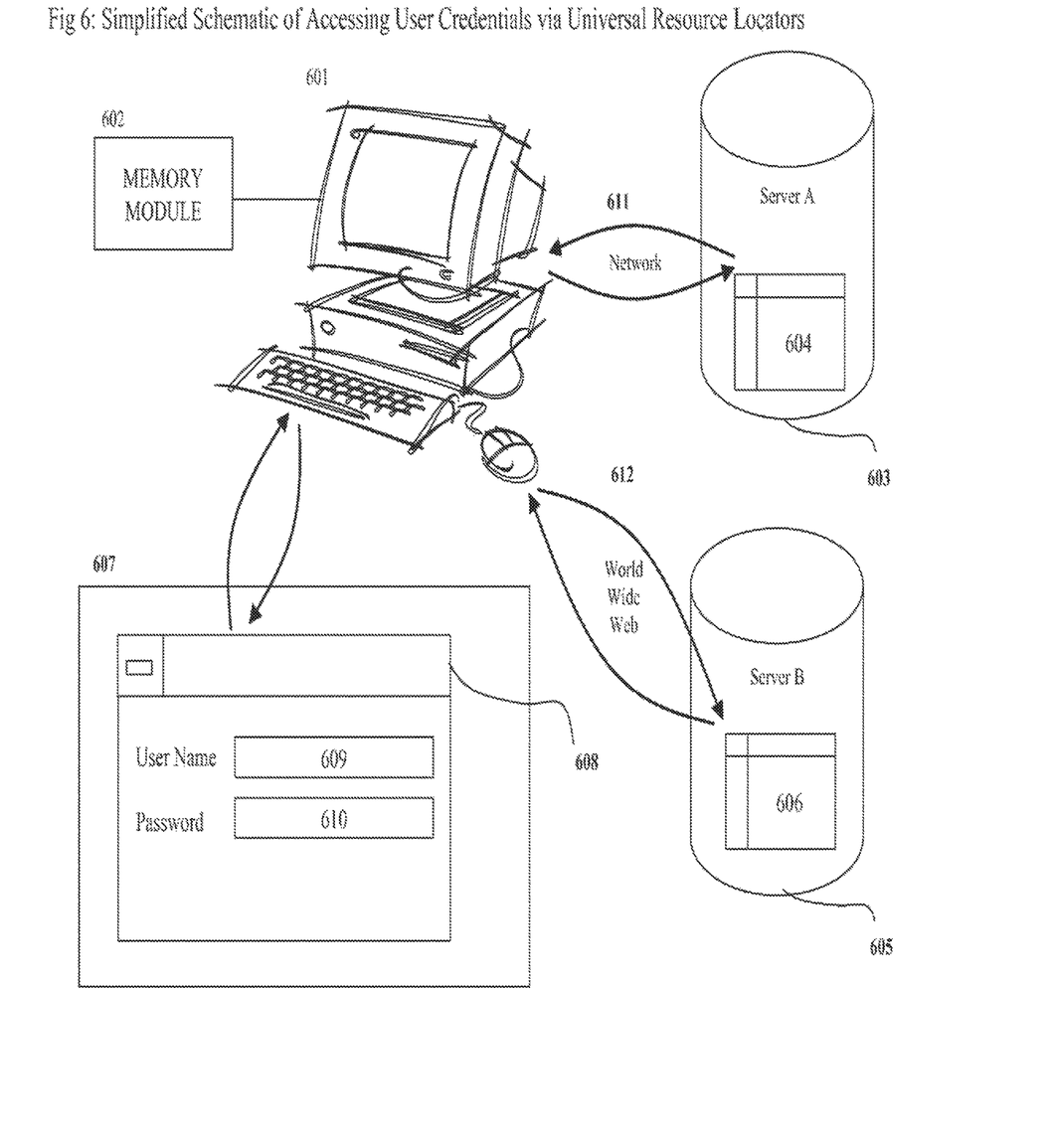
FIG. 6 illustrates the ability of the automated system to provide increased security via the use of arbitrary length passwords and or character sequences.

FIG. 6 illustrates the ability of the automated system to provide increased security via the use of arbitrary length passwords 610 and or character sequences. FIG. 6 is a simplified schematic of accessing user credentials via universal resource locators, showing computer 601, memory module 602, server A (603) with internal storage 604, server B (605) with internal storage 606, entry screen 608 with user name 609 and password 610, network 611, and world wide web 612. User name 609 is typically displayed as text in the appropriate field of screen 607. Typically, password 610 data is obfuscated during display thereof.

The structure and content of user authorization data is of arbitrary length and arbitrary content limited by the operating system requirements. Further, the user authorization data is digitally provided to the operating system. As such, allowable characters include characters not normally accessible to users entering them at, for example, a standard keyboard. In this manner the degree of security to the system is increased dramatically as the number of combinations for a password increases substantially and the ability to try some available combinations is extremely limited and sometimes beyond the scope of available input devices.

Figure 7:
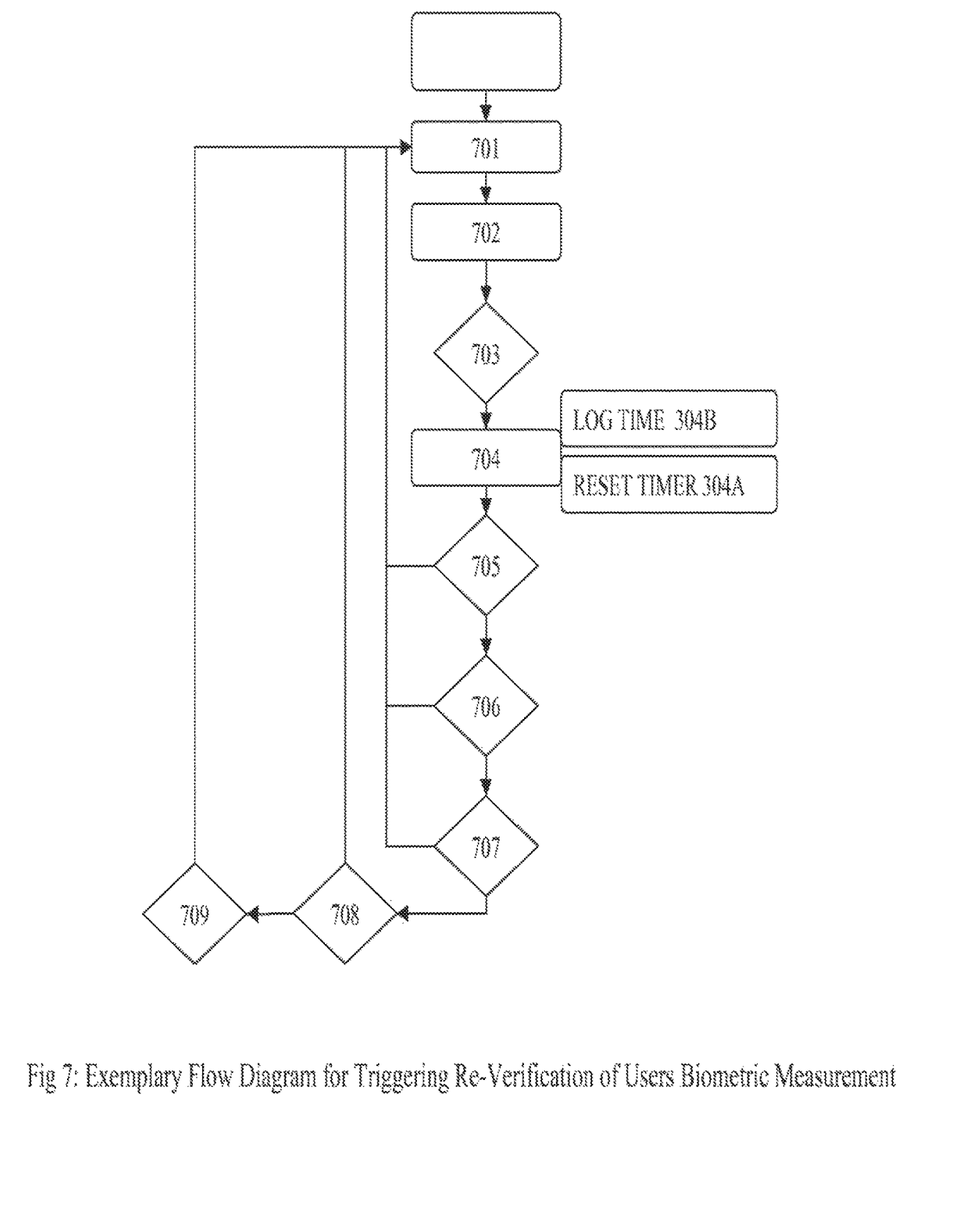
FIG. 7 illustrates the peripheral memory storage devices ability to bypass the physical user interface requirements of a computers operating system.

FIG. 7 shows a simplified flow diagram for a peripheral memory storage device wherein an application prompts for reverification of user authorization data under certain circumstances. At 701 the user is prompted to verify their identity by providing a biometric information sample to an authentication process. The process is in the form of a fingerprint authentication process. Upon placing a finger on a sensor, data relating thereto is acquired 702 and analyzed to authenticate the data 703. If the authentication fails then the system returns to 701 and awaits a new sample.

If the authentication is successful then the system at 704 logs the time of this authentication 304A and resets a timer 304B. As the user progresses to use the computer system the application is repeatedly performing a sequence of tests in the background and as follows:

- at 705 the computer system checks for a predetermined period of inactivity,
- at 706 the computer system checks for a predetermined period of time to have elapsed,
- at 707 the computer system checks for whether the user has requested to download files from certain secure information storage media,
- at 708 the computer system checks for whether the user has requested to upload files to certain secure information storage media, and
- at 709 the computer system checks for whether the user has been asked to provide secure information.

At each check the system determines whether or not to request the user to provide a further biometric information sample to revalidate their identity. If not the system loops back to 704 otherwise it loops back to 701.

Figure 8:
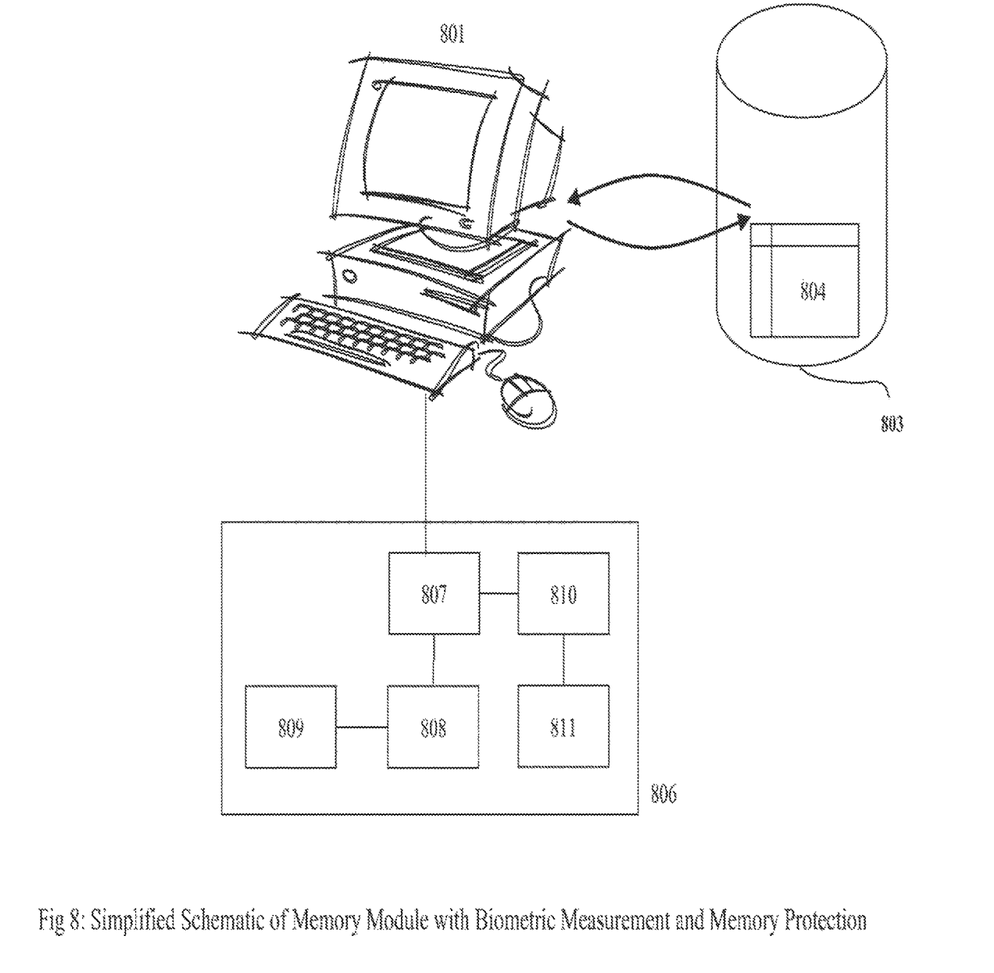
FIG. 8 illustrates a typical flow chart for the request of both initial and in-use verification of the user's identity.

Referring to FIG. 8 an embodiment is shown wherein the failure to provide correct user authorization data for verification results in disabling of the peripheral memory storage device either temporarily or permanently. FIG. 8 is a simplified schematic of a memory module with biometric measurement and memory protection, showing computer 801 and server 803 with internal storage 804.

The computer 801 comprises a USB port to which is coupled a peripheral memory storage device 806 providing secure user authorization data entry via keyboard mimicking. After the software application has prompted for entry of user authorization data, the user provides a biometric sample via the sensor 809, which is analyzed by the biometric analyzer 808, and a result is provided to internal microprocessor 807 of the peripheral memory storage device 806. If the data is authenticated then the user authorization data are entered automatically and securely by mimicking keyboard function of the peripheral memory storage device and data extracted from the peripheral memory storage device's internal memory 811. However, should the data be other than authenticated, then the microprocessor 807 triggers the electronic blowing of an internal fuse array 810 within the peripheral memory storage device. Said fuses 810 isolate a portion of the module memory having security data stored therein from the external world, removing the peripheral memory storage device 806 automatic login functionality. Optionally, instead of blowing fuses, software settings are altered requiring a security administrator to reset same.

Alternatively protection mechanisms such as selective overwriting of user authentication data, erasure of internal module firmware, over-writing or resetting to non-operational defaults are performed for securing the security data within the module. Additionally it is evident that said protection mechanisms are triggerable based on other predetermined events such as number of uses or date.

Numerous other embodiments may be envisaged without departing from the spirit or scope of the invention.

What is claimed is:

1. A peripheral memory storage device comprising:
   memory configured to store user authentication data, wherein the user authentication data is associated with a user and includes login information that is used to determine permissions granted to the user to access an operating system executing on a host computer system; and
   a processor in communication with the memory and the host computer system during bootup of the host computer system, the processor configured to:
     receive a biometric sample from a biometric transducer;
     receive a command from the operating system executing on the host, the command indicating readiness to accept input of the user authentication data to access the operating system; and
     in response to receipt of the command:
       retrieve the user authentication data from the memory; and
       provide the authentication data to the host computer system in response to physical verification of the biometric sample.

2. The peripheral memory storage device of claim 1, wherein the processor is in communication with the computer system via an interface.

3. The peripheral memory storage device of claim 2, wherein the interface is a wireless interface.

4. The peripheral memory storage device of claim 1, wherein the processor is further configured to disable access to a portion of the memory in response to a determination that the biometric sample is not verified.

5. The peripheral memory storage device of claim 1, further comprising a biometric sensor configured to collect the biometric information and to provide the biometric information to the processor for physical verification.

6. A computer system comprising:
   a computer system interface in communication with a peripheral memory device, wherein the interface is enabled by an operating system executing on the computer system prior to display of a login screen configured to receive user authentication data that includes login information associated with a respective user and to determine permissions granted to the respective user to access the operating system; and
   a computer processor in communication with the computer system interface and configured to start the operating system during a boot-up process, wherein the computer processor is configured to:
     provide a login request to access the operating system;
     receive, via the computer system interface, user authentication data from the peripheral memory device based on the login request; and
     provide the user authentication data including the login information associated with the respective user to the login screen to access the operating system including populating fields of the login screen with the user authentication data.

7. The computer system of claim 6, wherein the computer system interface is a wireless interface.

8. The computer system of claim 6, wherein the user authentication data includes a user password, a user identifier, or combinations thereof.

9. The computer system of claim 6, wherein the processor is further configured to load a driver to enable the computer system interface prior to display of the login screen.

10. The computer system of claim 9, wherein the peripheral memory device defines a user input device it will mimic and loads appropriate translation command structures for the user input device.

11. A method comprising:
- receiving, at a peripheral memory device from a computer system during bootup of the computer system, an operating system command indicating readiness to accept input of user authentication data to access the operating system, wherein the user authentication data includes login information associated with a respective user and is used to determine permissions granted to the respective user to access the operating system;
- receiving a request for biometric sample verification from the computer system;
- receiving a biometric sample;
- providing the biometric sample verification in response to physical verification of the biometric sample; and
- in response to receipt of the command:
  - retrieving the user authentication data from memory of the peripheral memory device; and
  - providing the authentication data to the computer system.

12. The method of claim 11, wherein providing the authentication data to the computer system is via a wireless communication interface.

13. The method of claim 11, further comprising receiving the biometric sample from a biometric transducer of the peripheral memory device.

14. The method of claim 11, further comprising disabling access to a portion of the memory of the peripheral memory device in response to a determination that the biometric sample is not verified.

15. The method of claim 14, wherein disabling access to the portion of the memory of the peripheral memory device in response to a determination that the biometric sample is not verified comprises blowing a fuse of a fuse array of the peripheral memory device, erasing the user authorization data, or combinations thereof.

16. The method of claim 11, wherein the user authentication data includes a user password, a user identifier, or combinations thereof.

\* \* \* \* \*